United States Patent [19]

Konigsburg et al.

[11] Patent Number: 5,802,571
[45] Date of Patent: Sep. 1, 1998

[54] APPARATUS AND METHOD FOR ENFORCING DATA COHERENCY IN AN INFORMATION HANDLING SYSTEM HAVING MULTIPLE HIERARCHICAL LEVELS OF CACHE MEMORY

[75] Inventors: Brian R. Konigsburg; John Stephen Muhich; Steven Wayne White, all of Austin, Tex.

[73] Assignee: International Business Machines Corporation, Armonk, N.Y.

[21] Appl. No.: 734,318

[22] Filed: Oct. 21, 1996

[51] Int. Cl.⁶ .................................................. G06F 12/12
[52] U.S. Cl. .................................... 711/143; 711/133
[58] Field of Search .................... 711/122, 133, 711/136, 140, 141, 143, 144, 145

[56] References Cited

U.S. PATENT DOCUMENTS

| | | | |
|---|---|---|---|
| 5,432,918 | 7/1995 | Stamm | 711/156 |
| 5,455,924 | 10/1995 | Shenoy et al. | 711/118 |
| 5,692,152 | 11/1997 | Cohen et al. | 711/140 |

Primary Examiner—Eddie P. Chan
Assistant Examiner—Kevin L. Ellis
Attorney, Agent, or Firm—Raymond M. Galasso; Anthony V. S. England

[57] ABSTRACT

An age-based arbitration scheme for enforcing data coherency in an information handling system is disclosed. As loads and stores access a cache, if a cache miss occurs, a miss request is generated and tagged with the cycle or age in which the miss is detected. If a castout is required, it is also tagged with the cycle in which the load or store access occurred, and the line being replaced or cast out is marked as being invalid in that level of hierarchy. The arbitration rules for the next level of memory hierarchy are defined such that all requests that are generated during a particular cycle are given priority over all of the requests generated during any subsequent cycle. As a result, if a load miss occurs for a cache line which is present in the castout buffer, the castout request tagged with an earlier age will be arbitrated into the next memory hierarchy level prior to the arrival of the newly generated miss requests. The age-based arbitration scheme can also be used for multiple cache accesses occurring in parallel.

16 Claims, 3 Drawing Sheets

APPARATUS AND METHOD FOR ENFORCING DATA COHERENCY IN AN INFORMATION HANDLING SYSTEM HAVING MULTIPLE HIERARCHICAL LEVELS OF CACHE MEMORY

FIELD OF THE INVENTION

The present invention relates to information handling systems and methods for operating information handling systems and, more particularly, to apparatuses and methods for enforcing data coherency in information handling systems including multiple hierarchical levels of cache memory.

BACKGROUND OF THE INVENTION

To alleviate the disparity between processor and memory speeds, most modern information handling systems rely on a memory hierarchy: a memory system normally consisting of RAM and ROM located outside of the processor and one or more levels of cache located within the processor. In most designs, the caches are managed as store-in caches from a given hierarchy level. There are typically two types of requests generated for the next level of hierarchy: miss requests and castout requests.

In many processor designs, when a cache miss occurs, if the cache entry selected for replacing it is valid and "dirty," that is, contains a modified version of the line, the dirty line is moved to a castout or store-back buffer. In general, these castout entries, which are the castout requests waiting to update the next hierarchy memory level, wait until either there are idle cycles on the bus between hierarchy levels or the castout buffer becomes full and an entry is required for a storage access. In most cases, the arbitration logic for the next hierarchy level gives the miss request priority over all existing castout requests. However, when a line is cast out of one level of the hierarchy and a later storage access generates a miss request for the same line, then the miss request must get the castout version of the line rather than a stale version from the next memory hierarchy level. This can be accomplished by boosting priority of the offending castout entry to be higher than that of the miss request, forcing the castout data to arrive at the next level prior to servicing the miss request. Alternatively, the data can be bypassed from the castout buffer directly. In either case, to detect such a conflict, address comparisons are made in hardware between new miss requests and existing castout buffer entries. Thus, to maintain data consistency, high performance designs typically include address comparators which determine whether the data requested by a miss request is present among the castout requests, in which case a miss request must be satisfied from the castout line rather than the stale line which is potentially present in the next level of memory hierarchy. In some cases, this additional comparison affects the time, within a cycle, that the arbitration logic can select which miss/castout request will next access the next level of the memory hierarchy. What is needed is an arbitration scheme which eliminates the need for the address comparisons between the miss requests and castout requests to thereby eliminate the need for hardware comparators for enforcing data coherency between the miss requests and castout requests at the same level in the memory hierarchy.

SUMMARY OF THE INVENTION

Accordingly, the present invention is directed to a method for enforcing data coherency in an information handling system including a first memory level and a second memory level. The method comprises the steps of: generating a miss request for a line of data from the second memory level when the line of data is not located in the first memory level; generating a castout request for replacing, in the second memory level, a line of data with a modified version of the line when the modified version of the line is removed from the first memory level; and giving priority to the request generated first.

The present invention also includes an apparatus for enforcing data coherency in an information handling system. The apparatus comprises a first memory level, a second memory level, circuitry for generating a miss request for a line of data from the second memory level when the line of data is not located in the first memory level and circuitry for generating a castout request for replacing, in the second memory level, a line of data with a modified version of the line when the modified version of the line is removed from the first memory level. The apparatus is characterized by arbitration logic for giving priority to one of the requests generated first.

The primary advantage of the present invention is the elimination of the need for hardware comparators for enforcing data coherency between miss requests and castout requests at the same level in the memory hierarchy.

DETAILED DESCRIPTION OF A PREFERRED EMBODIMENT OF THE INVENTION

Figure 1:
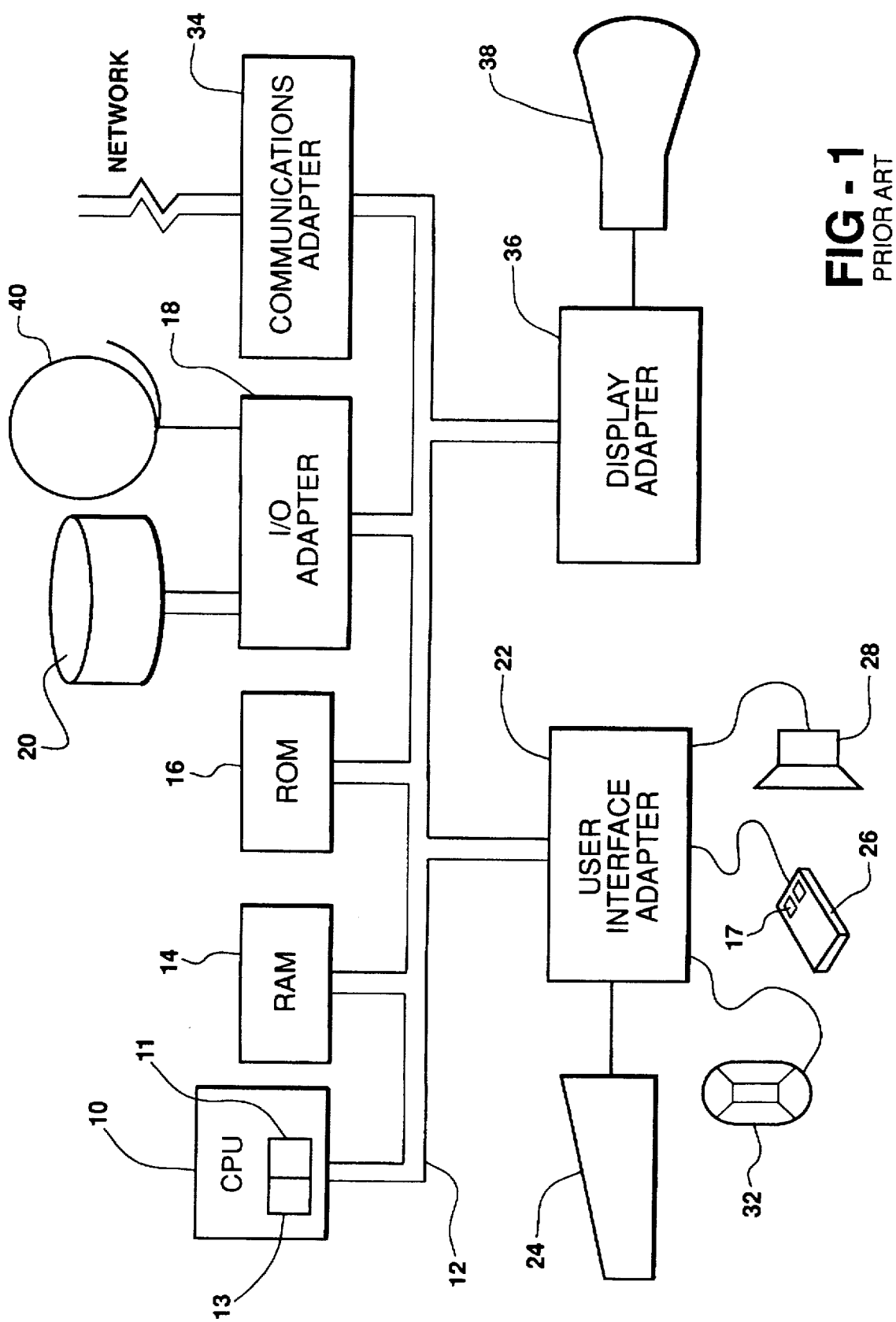
FIG. 1 is an information handling system embodying the present invention.

A representative hardware environment for practicing the present invention is depicted in FIG. 1, which illustrates a typical hardware configuration of an information handling system in accordance with the subject invention. The information handling system includes at least one central processing unit (CPU) 10 with one or more integrated data transfer units 11, one or more levels of cache memory 13, and a number of other units, such as one or more execution units (not shown) or a memory management unit (not shown). CPU 10 is interconnected via system bus 12 to random access memory (RAM) 14, read-only memory (ROM) 16, and input/output (I/O) adapter 18 for connecting peripheral devices such as disc units 20 and tape drives 40 to bus 12, user interface adapter 22 for connecting keyboard 24, mouse 26 having a button 17, speaker 28, microphone 32, and/or other user interface devices such as a touch screen device (not shown) to bus 12, communication adapter 34 for connecting the information handling system to a data processing network, and display adapter 36 for connecting bus 12 to display device 38.

Unless otherwise specified, the word "data" means any information and includes data and instructions.

Cache memory 13 is one part of the overall concept of storage hierarchies where faster but less dense memories are placed closer to CPU 10, and slower but more dense or bigger memories back them up. Cache memory 13 may have one or more levels of storage hierarchy wherein the most frequently requested data by CPU 10 is stored in a first level of cache memory, the next most frequently requested data is stored in a second level of cache memory and the least frequently requested data is stored in a main memory such as RAM 14 or ROM 16 located outside of CPU 10. When CPU 10 needs to make a request for data from memory, data transfer units 11 search cache memory 13 for the address of the cache line containing the desired data. If the cache line is available a hit occurs and the data in the cache line is transferred. If the cache line is not in cache memory 13, then a miss or cache fault occurs. If cache memory 13 has multiple levels each level is searched one at a time until a hit occurs.

Figure 2:
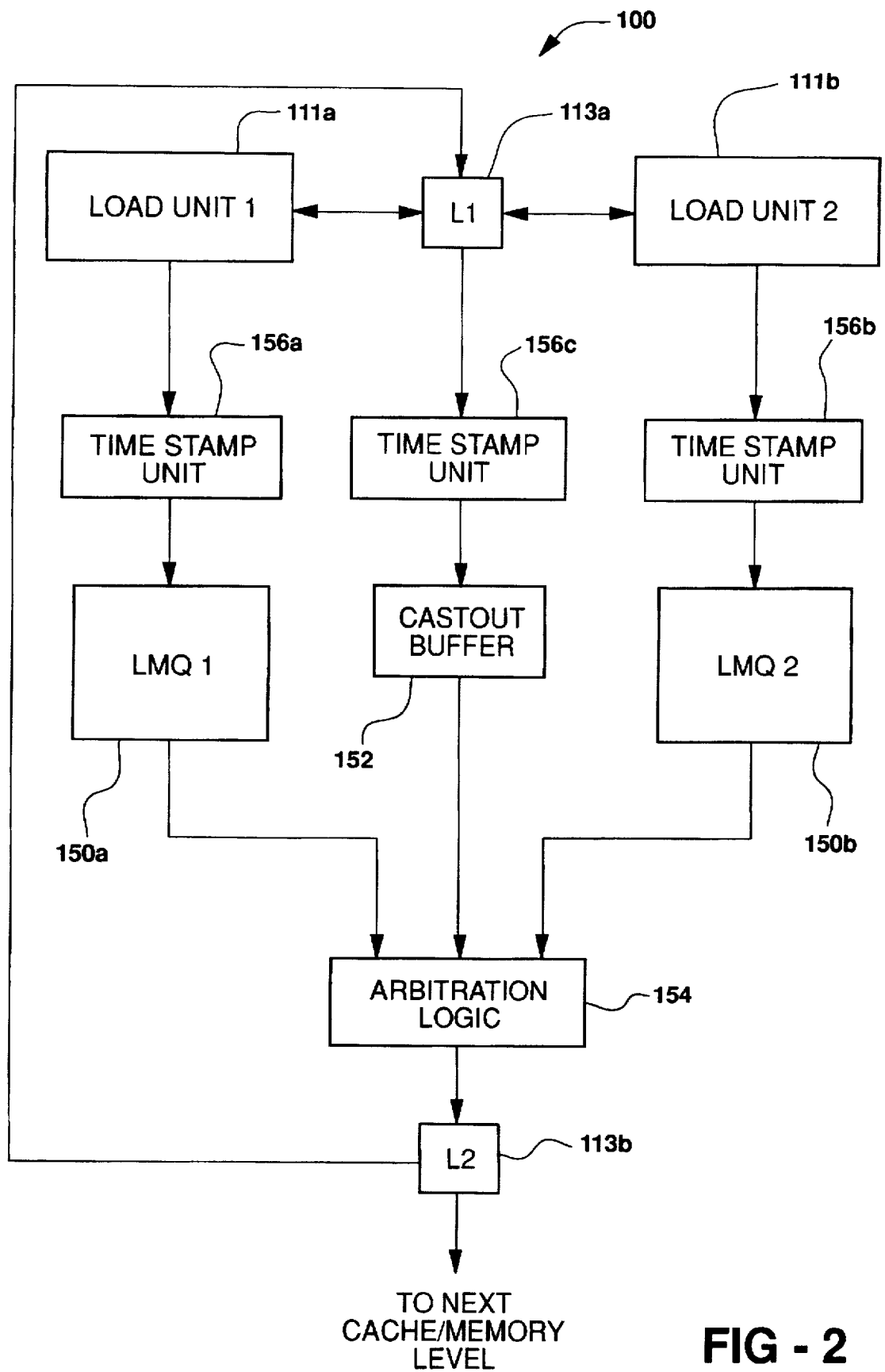
FIG. 2 is a block diagram of an apparatus according to the present invention.
Figure 3:
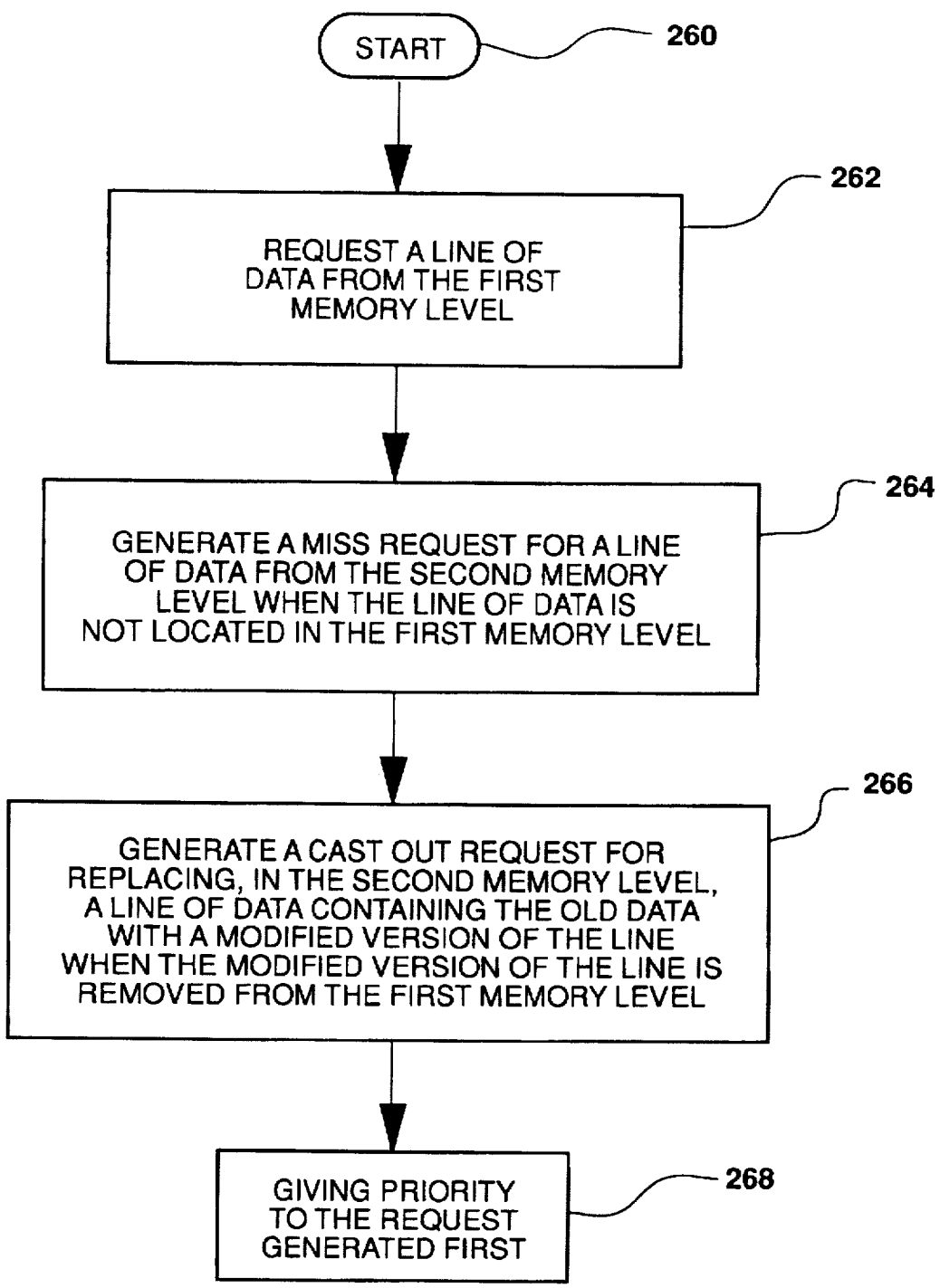
FIG. 3 illustrates a method according to the present invention.

Referring now to FIG. 2, a block diagram illustrating an apparatus according to the present invention is depicted. Reference numerals used in FIG. 2 which are like or similar to reference numerals used in FIG. 1 are intended to indicate like or similar components. In the preferred embodiment, the apparatus of the present invention is implemented within a central processing unit (CPU) 100. CPU 100 includes data transfer units 111a, 111b, a level one cache 113a and a level two cache 113b. Data transfer units 111a and 111b are operably associated with level one cache 113a for transferring data within CPU 100. Data transfer units 111a, 111b include request circuitry for requesting data, to be transferred by data transfer units 111a, 111b, from level one cache 113a. Data transfer units 111a, 111b are preferably load units; however, data transfer units 111a, 111b may be load/store units or store units. Level one cache 113a stores a first set of data for use by CPU 100, and level two cache 113b stores a second set of data for use by CPU 100. Level one cache 113a and level two cache 113b include addressable memory locations or cache lines of data such that data is stored in a memory location or a cache line within level one cache 113a and level two cache 113b having a unique address. CPU 100 further includes miss queues 150a, 150b. Miss queue 150a is operably coupled to data transfer unit 111a, and miss queue 150b is operably coupled to data transfer unit 111b. Miss queues 150a, 150b are also operably coupled to level two cache 113b.

CPU 100 further includes a castout or store-back buffer 152 operably associated with level one cache 113a and level two cache 113b.

In operation, the request circuitry of data transfer units 111a or 111b request cache lines of data from level one cache 113a. When a request for a cache line in level one cache 113a misses the cache or, in other words, the address for the cache line of data is not found in level one cache 113a, the request for such line of data is sent to the next hierarchical memory level, level two cache 113b of CPU 100. Such requests for cache lines of data from data transfer units 111a, 111b wherein the cache lines are not located in level one cache 113a are stored in miss queues 150a or 150b. Requests for cache lines stored in miss queues 150a or 150b are forwarded to level two cache 113b wherein each requested cache line address is searched for to determine whether level two cache 113b contains such address, thus producing a hit. If a cache line is not found in level two cache 113b, then the request for such cache line is forwarded to the next hierarchical memory level.

After a cache line is located, a copy of the cache line is sent to the data transfer unit requesting the same and to the level one cache 113a. When storing a copy of the cache line into cache 113a a selected cache line already in cache 113a must be removed to provide memory space. If the selected cache line contains "dirty" data or, in other words, is a modified version of the line, the selected cache line is cast out or removed from level one cache 113a and stored in a castout buffer 152. A cache line is said to be dirty when the cache line is a modified version of the line stored in the next or lower hierarchical memory levels. A cache line may be modified by a store. The modified version of the line may be said to contain new data, and the unmodified line may be said to contain old data.

CPU 100 further includes circuitry for generating a castout request for replacing, in level two cache 113b, an unmodified version of the selected cache line of data containing the old data, i.e., a stale line, with the modified version of the selected cache line removed from level one cache 113a, stored in castout buffer 152, and containing the new data. The castout request is stored in castout buffer 152 with the dirty line of data seeking to replace the stale line in level two cache 113b. The castout request is generated when the modified version of the selected line is cast out of level one cache 113a.

According to the present invention, CPU 100 further includes arbitration logic 154 for giving priority to one of the requests, i.e., one of the miss requests stored in miss queues 150a or 150b or castout requests stored in castout buffer 152 generated first. In other words, a request or set of requests generated during a particular cycle in CPU 100 are given priority over all requests generated during any subsequent cycle. Arbitration logic 154 is operably coupled to miss queues 150a, 150b and castout buffer 152 as well as to level two cache 113b.

CPU 100 further includes time-stamp units 156a, 156b, and 156c for time-stamping each miss request when generated and time-stamping each castout request when generated. Time-stamp unit 156a tags each miss request generated for storage in miss queue 150a with the cycle or age in which the miss requests were generated. Time-stamp unit 156b tags each miss request generated for storage in miss queue 150b with the cycle or age in which the miss requests were generated. Time-stamp unit 156c is operably associated with the castout buffer 152 for tagging each castout request generated for storage in castout buffer 152 with the cycle or age in which the castout request was generated. Preferably, time-stamp units 156a–156c are counters which are tied in to the internal clock (not shown) of CPU 100. In this manner, each miss request stored in miss queues 150a, 150b have a corresponding tag indicating the age of each miss request. In a similar fashion, each castout request stored in castout buffer 152 has a tag indicating the age of each castout request. Arbitration logic 154 gives priority to the oldest request stored in miss queues 150a, 150b or castout buffer 152 and forwards this request to level two cache 113b. In this manner, if a miss request in miss queue 150a or miss queue 150b and a castout request in castout buffer 152 are for the same cache line of data, then the request generated earlier in time will gain access to level two cache 113b first. If a miss request occurs for a cache line which is present in the castout buffer 152, the castout request tagged with an earlier age will be arbitrated into level two cache 113b by arbitration logic 154 prior to the miss request accessing level two cache 113b. In this manner, the miss request will not cause use of stale data by the information handling system.

The present invention also includes a method for enforcing data coherency in an information handling system including a first hierarchical memory level and a second hierarchical memory level. The method starts with step 260. In step 262, a line of data from the first memory level is requested, and in step 264, a miss request for a line of data from the second memory level is generated when the line of data is not located in the first memory level. In step 266, a castout request is generated for replacing, in the second memory level, a line of data with a modified version of the line when the modified version of the line is removed from the first memory level. In step 268, priority is given to the request generated first. Step 268 further includes the steps of time-stamping the miss request when generated and time-stamping the castout request when generated. Step 268 further includes the step of replacing, in the second memory level and in response to a castout request, a line of data with a modified version of the line of data removed from the first memory level before a miss request for the same line of data requests the first line of data from the second memory level when the castout request was generated before the miss request.

Step 264 includes the step of generating multiple miss requests for lines of data not located in the first memory level. The method also includes the step of time-stamping each of these miss requests. Step 266 further comprises the step of generating multiple castout requests for replacing, in the second memory level, lines of data with modified versions of the lines when the modified versions of the lines are removed from the first memory level. The method of the present invention further includes the steps of time-stamping each of these castout requests and giving priority to the request, from all of the miss requests and castout requests, generated first.

Although the present invention and its advantages have been described in detail, it should be understood that various changes, substitutions and alterations can be made herein without departing from the spirit or scope of the invention as defined in the appended claims.

What is claimed is:

1. A method for enforcing data coherency in an information handling system including a first memory level and a second memory level, said method comprising the steps of:
   generating a miss request for a line of data from the second memory level when the line of data is not located in the first memory level;
   generating a castout request for replacing, in the second memory level, a line of data with a modified version of the line when the modified version of the line is removed from the first memory level;
   giving priority to the request generated first;
   time-stamping the miss request when generated; and
   time-stamping the castout request when generated.

2. The method, as recited in claim 1, wherein said step of giving priority further includes the step of replacing, in the second memory level and in response to a castout request, a line of data with a modified version of the line of data removed from the first memory level before a miss request for the same line of data requests the line of data from the second memory level when the castout request was generated before the miss request.

3. The method, as recited in claim 1, wherein the step of generating a castout request comprises generating multiple castout requests for replacing, in the second memory level, lines of data with modified versions of the lines when the modified versions of the lines are removed from the first memory level, and wherein the step of generating a miss request comprises the step of generating multiple miss requests for lines of data not located in the first memory level.

4. The method, as recited in claim 3, comprising the steps of:
   time stamping each of the miss requests and castout requests; and
   giving priority to the request generated first.

5. A method for enforcing data coherency in an information handling system including a first memory level and a second memory level, said method comprising the steps of:
   generating a miss request for a line of data from the second memory level when the line of data is not located in the first memory level;
   generating a castout request for replacing, in the second memory level, a line of data with a modified version of the line when the modified version of the line is removed from the first memory level;
   giving priority to the request generated first;
   generating second and third miss requests for lines of data not located in the first memory level; and
   time-stamping each miss request.

6. The method, as recited in claim 5, further comprising the step of generating multiple castout requests for replacing, in the second memory level, lines of data with modified versions of the lines when the modified versions of the lines are removed from the first memory level.

7. The method, as recited in claim 6, further comprising the step of time-stamping each castout request.

8. The method, as recited in claim 7, further comprising the step of giving priority to the request generated first.

9. An apparatus for enforcing data coherency in an information handling system, said apparatus comprising:
   a first memory level;
   a second memory level;
   means for generating a miss request for a line of data from said second memory level when the line of data is not located in said first memory level;
   means for generating a castout request for replacing, in said second memory level, a line of data with a modified version of the line of data when the modified version of the line is removed from said first memory level; and
   means for giving priority to one of said requests generated first, wherein said means for giving priority includes means for time-stamping said miss request when generated and means for time-stamping said castout request when generated.

10. The apparatus, as recited in claim 9, wherein said means for giving priority includes means for replacing, in said second memory level and in response to a castout request, a line of data with a modified version of the line of data removed from said first memory level before a miss request for the same line of data requests the line of data from said second memory level when said castout request was generated before said miss request.

11. The apparatus, as recited in claim 9, wherein the means for generating a castout request comprises means for generating multiple castout requests for replacing, in the second memory level, lines of data with modified versions of the lines when the modified versions of the lines are removed from the first memory level, and wherein the means for generating a miss request comprises means for generating multiple miss requests for lines of data not located in the first memory level.

12. The apparatus, as recited in claim 11, comprising:
   means for time stamping each of the miss request and castout requests; and
   means for giving priority to the request generated first.

13. An apparatus for enforcing data coherency in an information handling system, said apparatus comprising:
   a first memory level;
   a second memory level;

means for generating a miss request for a line of data from said second memory level when the line of data is not located in said first memory level;

means for generating a castout request for replacing, in said second memory level, a line of data with a modified version of the line of data when the modified version of the line is removed from said first memory level; and means for giving priority to one of said requests generated first, wherein said means for generating a miss request includes means for generating multiple miss requests for lines of data not located in said first memory level, and;

means for time-stamping each miss request when generated.

14. The apparatus, as recited in claim 13, wherein said means for generating a castout request includes means for generating multiple castout requests for replacing, in said second memory level, lines of data with modified versions of the lines when the modified versions of the lines are removed from said first memory level.

15. The apparatus, as recited in claim 14, comprising means for time-stamping each castout request when generated.

16. The apparatus, as recited in claim 15, wherein said means for giving priority includes means for giving priority to one of said requests generated first.

\* \* \* \* \*